Feb. 14, 1933.  G. A. MONTGOMERY  1,897,322
TORSION AND COUPLING CONTROLLING DEVICE
Filed June 24, 1927   2 Sheets-Sheet 1
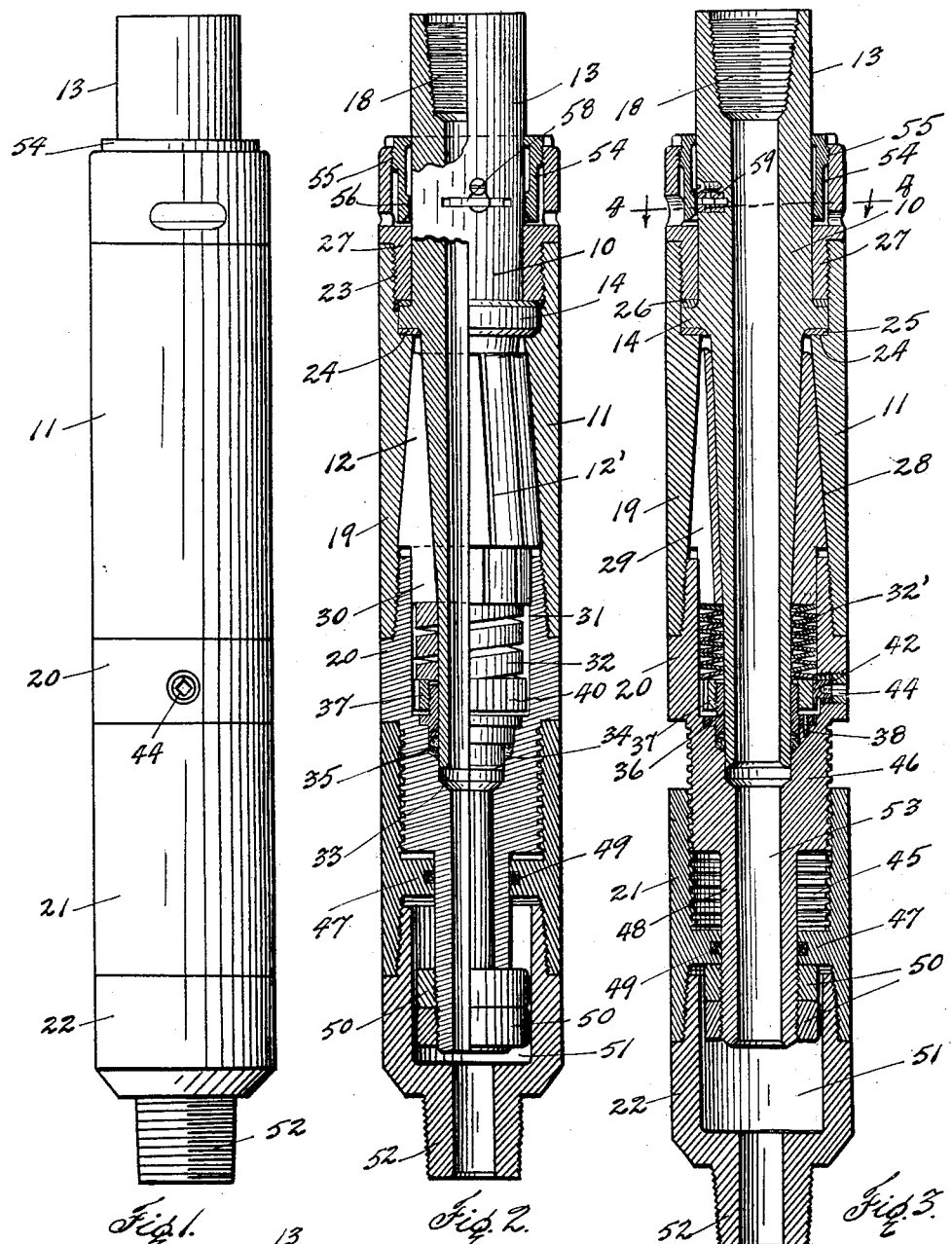
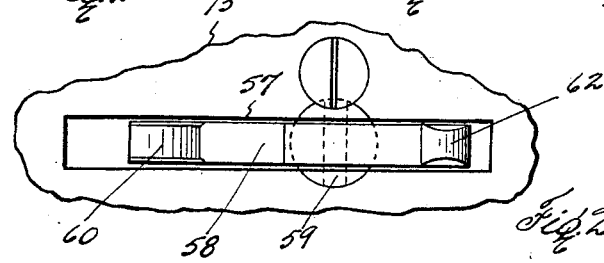
INVENTOR
G. A. Montgomery.
BY
Jack A. Ashley
ATTORNEY Feb. 14, 1933.    G. A. MONTGOMERY    1,897,322
TORSION AND COUPLING CONTROLLING DEVICE
Filed June 24, 1927    2 Sheets-Sheet 2
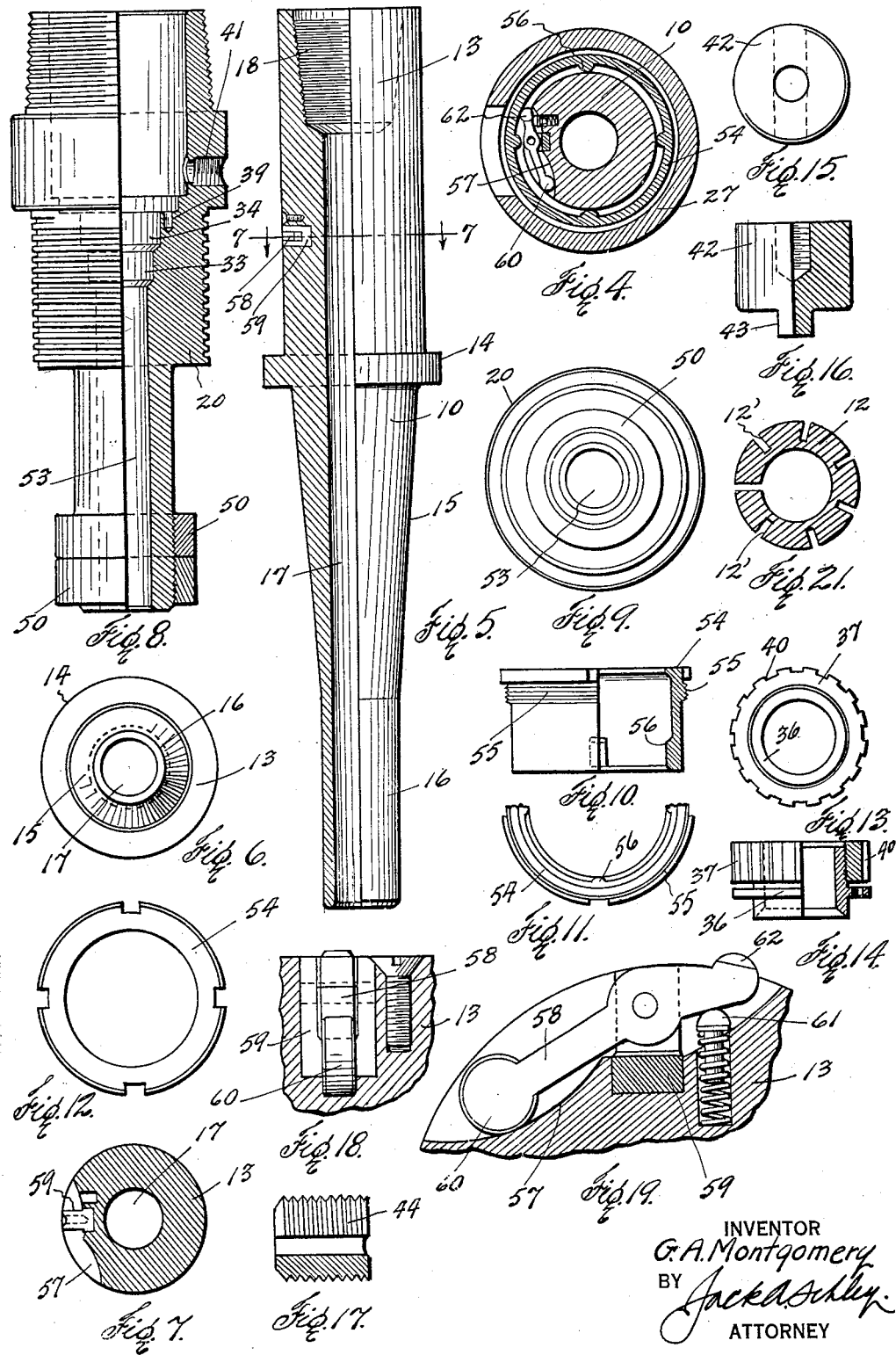
INVENTOR
G. A. Montgomery
BY Jack A. Schley
ATTORNEY Patented Feb. 14, 1933

1,897,322

UNITED STATES PATENT OFFICE

GUSTAVUS A. MONTGOMERY, OF DALLAS, TEXAS

TORSION AND COUPLING CONTROLLING DEVICE

Application filed June 24, 1927. Serial No. 201,077.

This invention relates to new and useful improvements in torsion and coupling controlling devices for well drill stems.

The object of the invention is to provide means for connecting the drill stem of a rotary drilling rig, whereby upon the drill bit becoming stuck at the bottom of the hole, and all loose connections in the drill stem being tightened, said means will yield and permit rotation of the stem above said means, thus relieving the stuck bit and the stem attached thereto, from injurious torque and undue torsional strain.

A particular object of the invention is to include in the drill stem a frictional clutch adapted to resist slippage under a maximum safe torque whereby effective drilling may be performed under normal conditions, and so arranged that the maximum amount of torsional force may be transmitted, but also so designated as to slip when the bit becomes stuck and thus automatically prevent twisting off of the drill stem as well as eliminating excessive distortion and back-lash.

A further object of the invention is to provide a torsional control device including a friction clutch designed to lend itself to use within the comparatively narrow limits of a drill stem and involving ample contact areas to assure a relatively large torsional transmission, even at low speeds.

Another object of the invention is to provide a torsion control device capable of operation in mud-laden fluids, thus being safeguarded against overloads, and also arranged to convey such fluids, as well as operating in and conveying fluids containing corrosive and attritive substances, all without harmful or retarding influences.

A still further object of the invention is to provide an audible alarm or signal for automatically informing the driller when slipping takes place.

An advantageous feature of the invention is the combination with the torsion control of means for taking up back-lash and reverse torque, thus preventing unscrewing of the tool joints or couplings connecting the lengths of pipe making up the drill stem.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is an elevation of a device constructed in accordance with the invention, Fig. 2 is a vertical sectional view of said device, some of the parts being in elevation, Fig. 3 is a similar view showing another form of tension means, Fig. 4 is a horizontal cross-sectional view taken on the line 4—4 of Fig. 3, Fig. 5 is a detail of the driver, Fig. 6 is an underside view of the same, Fig. 7 is a horizontal cross-sectional view taken on the line 7—7 of Fig. 5, Fig. 8 is a detail of the body of the driven member, Fig. 9 is an underside view of the same, Figs. 10 and 11 are details of the gong, Fig. 12 is a plan view of the same, Fig. 13 is a plan view of the tension ring, Fig. 14 is a detail of the same, Fig. 15 is a plan view of the retaining plug, Fig. 16 is a detail of the same, Fig. 17 is a detail of the lock screw, Figs. 18, 19 and 20 are details of the gong clapper mechanism, and Fig. 21 is a cross-sectional view of the clutch.

In the drawings the numeral 10 designates a driving member, 11 a driven member and 12 a friction clutch interposed between said members. The driving member is tubular and includes at its upper end a cylindrical shank 13 surrounded at its lower end by an outwardly directed collar 14 while a mandrel extends from the collar and includes a downwardly tapering clutch shank 15 and a cylindrical stem 16, as is shown in detail in Fig. 5. The driving member 10 has an axial bore 17 terminating in a threaded socket 18 at its upper end for receiving the drill stem connection (not shown).

The driven member 11 includes a cylindrical barrel 19, a body 20 onto which the barrel is screwed, a coupling 21 screwed onto the lower end of the body and a plug 22 screwed into the lower end of the coupling. The upper end of the barrel 19 is counterbored at 23, internally screwed and formed with an annular shoulder or seat 24. The driving member 10 is inserted through the counter bore.

A suitable friction washer 25 resting on the shoulder 24 received the collar 14 of the driving member. A second friction washer 26 is held upon the collar by a bushing 27 screwed into the bore 23. These washers may be of any material suitable for the purpose. The barrel 19 has an internal upwardly tapered clutch surface 28 and a conical clutch sleeve 29 having converging inner and outer surfaces is interposed between the parts 28 and 15, its surfaces conforming to said clutching surfaces, whereby elongated frictional contact is communicated to the barrel.

The clutch has a reduced shank 30 at its lower end slidable in a vertical socket 31 in the upper end of the body 20. The clutch may be urged upwardly by any suitable means, such as a helical spring 32 as is shown in Fig. 2, or by a plurality of superposed cupped spring washers 32' as is shown in Fig. 3, or otherwise.

It will be seen that the co-efficient of the frictional contact may be varied by the tension of the spring. In order to assure a maximum frictional contact, the clutch is split longitudinally and is also provided with longitudinal kerfs 12', as is best shown in Figs. 2 and 21. Adjustment is made so that the combined statical friction provided by the washers 25 and 26 and the collar 14 and the clutch 12 and the mandrel 15 and the barrel 19 is a certain fraction less than the force required to burst off the drill stem. The stem 16 of the mandrel extends down through the spring into a sump 33. A packing gland 34 is provided at the top of the sump and receives a packing ring 35, which is caused to snugly embrace the stem by a flanged follower 36, counter-sunk in the upper end of the gland.

The follower has its upper end screw-threaded and extending into the socket 31. As is best shown in Figs. 2, 3 and 14 a tension nut 37 is threaded on the upper end of the follower above the flange of the latter. To hold the follower against rotation a dowel pin 38 carried by the follower engages in a socket 39 (Fig. 8) at the side of the gland 34. The tension nut 37 has peripheral notches 40 (Figs. 13 and 14) and a suitable tool inserted through an opening 41 (Figs. 3 and 8) in the side of the body 20 may be engaged in said notches to rotate the nut and vertically adjust it. The spring 32 or 32' rests upon said nut and the tension thereof may thus be regulated. For securing the tension nut a retaining plug 42 (Figs. 3, 15 and 16) is slidable in the opening 41 and has a tongue 43 for engaging in the notches 40. The plug is held in place by a lock screw 44 inserted in the opening 41.

For taking up back-lash in the drill stem the coupling 21 is provided and this coupling is formed with an internally screw-threaded socket 45 for receiving the screw-threaded shank 46 (Figs. 2, 3 and 8) of the body 20. The coupling has an annular internal collar 47 snugly receiving the stem 48 of the shank. A packing 49 seated in the collar embraces the stem.

A pair of nuts 50 on the lower end of the stem limit the unscrewing and downward movement of the coupling. The plug 22 has a chamber 51 for receiving the nuts when the coupling is screwed up as is shown in Fig. 2. A screw-threaded pin 52 is provided on the bottom of the plug for screwing into the drill stem (not shown). An axial bore 53 extends through the shank 46 and stem 48 and with the bore 17 of the driving member 10 provides a continuous fluid conductor through the center of the device. The packing ring 35 and the packing 49 provide against leaks and the loss of fluid pressure.

Within the upper end of the bushing 27 is screwed a cylindrical gong 54 (Figs. 2, 3, 4, 10, 11 and 12). The gong is suspended by a screw-threaded collar 55 so that its lower portion is spaced from the bushing and driving member 10 which the gong surrounds. On the inner periphery of the gong spaced bosses 56 (Figs. 10 and 11) are provided.

The upper portion of the driving member 10 is provided with a horizontal recess 57 (Figs. 3, 4, 7, 19 and 20). A striking lever 58 is pivoted to a bracket 59 secured in said recess. The lever 58 has a clapper 60 normally held in the recess by a spring plunger 61 (Fig. 19). A tripping head 62 on the end of the lever opposite the clapper projects from the recess. The bosses 56 are in the path of the tripping head, so that when the driving member 10 rotates independently of the driven member, as by the slipping of the clutch, the bosses will trip the lever 58 causing the clapper 60 to strike the gong.

The device may be connected in the drill stem just below the grief stem, but other locations may be found more desirable. The spring 32—32' is adjusted to give the desired contact between the clutch 12 and the mandrel 15 of the driving member 10 and the barrel 19 of the driven member 11.

In drilling practice, the following would take place: The driller would feed the drill to the formation in his accustomed manner, and eventually crowd the drill so much that the resistance at the drill points equals the adjusted friction between the driving and driven members of the device. During this heavy torque on the drill pipe or stem, a definite proportional distortion has taken place in the drill pipe. In a long drill string, the twist or torque of the drill stem may amount to as much as a complete rotation or even more. Still, the distortion may be less than the force required to overcome the static friction limit. In other words, the drill pipe has a certain amount of "springiness". Suddenly the drill strikes a crevice in the formation, and the drill's rotation is immediately and violently arrested or stopped. The drill pipe having been under a maximum safe torque, continues to rotate in its upper part, but has become solidly seized by the drill at the lower end.

Remembering that the rotary machinery has excess of power over that required to twist off the drill pipe, it follows that as soon as the drill stem becomes anchored in its lower end, and the full power of the rotary machinery continues to supply torsion to the upper end, the moment will come when either the drill stem will twist off or, as is intended to happen, the friction surfaces 15 and 28 will suddenly slip on the clutch 12. Now, according to the laws of friction, the kinetic friction is appreciably less than the static friction, in some cases by as much as halving the static friction. It is then natural that as soon as the friction members slip, the torque on the drill pipe is immediately halved or nearly so. At the moment of the beginning of the slippage, the drill stem has stored energy proportional to the torsional distortion within the elastic limit and exactly equal to the static friction of the mechanism.

As soon as slippage takes place, that fraction of the stored torsional energy which exceeds the kinetic friction of the contacting surfaces is immediately released, and manifests itself in a violent reversed rotation, which is greatest in the extreme upper end of the drill stem and gradually lessens until at the point where the lower end of the stem becomes anchored, the reverse rotation is nil. When the stored energy has spent itself in back-lash the torsional distortion in the drill pipe becomes equal to kinetic friction in the friction mechanism. The rotary machinery may then continue to run without over-stressing the drill stem. However, as soon as slippage takes place the gong 54 is sounded.

Upon hearing the gong or otherwise observing that the friction members are slipping, it then becomes the duty of the driller to stop rotating and lift the drill from the well bottom. At the moment when the drill becomes released from its anchorage the residue of the stored torsional energy in the drill stem, which is equal to the kinetic friction in the friction mechanism, becomes released and is spent in a violent reverse turning, or as it is called by drillers, back-lash. This back-lash is at times so violent that by its momentum the loosest screwed together joint in the drill stem unscrews and drops into the well bore. To avoid such a calamity, the coupling 21 with the shank 46 and the socket 45 are provided. These parts have sufficient driving qualities when screwed up, but readily unscrew.

It will be seen that when the drill stem is lifted and the drill released, the coupling 21 will begin to unscrew from the shank 46. It is assumed that even the most violent back-lash or reverse rotation, will be taken up before the nuts 50 engage the collar 47. The parts are so arranged that a sufficient number of threads will remain in mesh to support the pendant load.

Upon releasing the bit and neutralizing the back-lash, the driller may renew boring by merely lowering the stem and drill into the bottom of the well. The unscrewing preventer is then screwed home by the rotary. While various materials may be used in the construction of the parts, case hardened steel surfaces on the mandrel 15 and barrel 19 when used with a clutch 12 of bronze, have been found to give very satisfactory results; however, cast iron, hard wood or other materials may be used.

Various changes in the size and shape of the different parts, as well as modifications and alterations, may be made within the scope of the appended claims.

What I claim, is:

1. In a coupling for a well-bit drill stem, a driving member including a longitudinal clutching surface, a driven member including a longitudinal clutching surface, a longitudinal clutch interposed between the clutching surfaces of said members, a stuffing box intermediate the driving and driven members, and resilient means acting upon said box and clutch for urging said clutch into engagement with the clutching surfaces of said members.

2. In a coupling for a well-bit drill stem, a driving member having a longitudinal moderately inclined clutching surface, a driven member having a longitudinal clutching surface moderately inclined toward the other clutching surface, an oppositely tapered clutch engaging between and contacting with the clutching surfaces of the members, a coiled spring engaging and urging said clutch into frictional engagement with said surfaces, and means for locking said spring under selected adjusted tension.

3. In a coupling for a well-bit drill stem, a driving member having a tubular mandrel provided with a long tapered clutching surface, a driven member having a central opening receiving the mandrel, a stuffing box in the opening of the driven member surrounding the mandrel, a barrel carried by the driven member having a long converging clutching surface, an elongated double tapered clutch sleeve frictionally engaging the clutching surfaces of the members and having a slidable shank, and a spring sustaining the clutch shank and bearing upon the stuffing box to tension the same.

4. In a device of the character described, a driving member having an annular collar and an inclined clutching surface, a driven member having a seat and an inclined clutching surface, friction washers engaging on each side of the driving member collar, one of said washers resting on the seat of the driven member, means for confining said washers, a tapered clutch engaging between the clutching surfaces of the driving and driven members, and resilient means urging the clutch into frictional engagement with said members and capable of adjustment to vary the static friction of such engagement.

5. In a coupling for a well-bit drill stem, a tubular driven member for attachment to a drill stem and having a frictional clutching surface, a driving member having a mandrel fitting in the driven member and provided with a frictional clutching surface, and a resilient conical clutch interposed between said members and frictionally engaging the clutching surfaces of said members, said clutch being provided on one clutch face with longitudinal incisions whereby its surface is made flexible for conforming to said clutching surfaces, the driven member and the driving member having water-tight connections whereby fluid is prevented from entering the coupling except from the drill stem.

6. In a device of the character described an elongated driving member having a fixed clutch face and means for attachment to a drill stem, an elongated driven member having a cooperating clutch face, one member being relatively inserted in the other member, and a clutch sleeve engaging the faces of said members and being unattached thereto, whereby either member may rotate independently of said sleeve.

7. In a device of the character described, a driving member, a driven member frictionally engaged therewith, portions of the members being concentrically associated to provide an annular space between the members, a sounding element carried by one of the members in said space and surrounded by a portion of the other member, a striker carried by said other member adapted to strike the sounding element during relative rotation of the members.

8. In a device of the character described, a driving member, a driven member frictionally engaged therewith, portions of the members being concentrically associated to provide an annular space between the members, a sounding element carried by one of the members in said space and surrounding a portion of the other member, and a striker carried by the other member normally out of contact with the sounding element and adapted to strike the sounding element during relative rotation of the members.

9. A device as claimed in claim 7, in which the sounding element is a sleeve having peripheral ribs adapted to be struck by the striker during relative rotation of the members.

10. A coupling for a well-bit drill stem including a driven member and a driving member, portions of said members interfitting in coaxial relation providing an annular space between the members, a friction clutch sleeve received in said space, a nut having peripheral notches mounted on one of the members and extending into said space, a spring interposed between the sleeve and the nut and adjustable by rotation of the nut, a portion of the member surrounding the nut being apertured for the reception of an adjusting tool adapted to engage the notches to rotate the nut.

11. A device as claimed in claim 10 in which a plug is slidably received in the aperture in the member to lock the nut in selected adjusted positions.

12. In a coupling for a well-bit drill stem, an elongated driving member having means at its upper end for attaching it to a tubular drill stem, an elongated driven member into which the driving member telescopes and which has means at its lower end for attaching it to a drill stem, an elongated split friction clutch sleeve having inner and outer inclined frictional contact faces interposed between and engaging the adjacent faces of the members, and resilient means within the driven member engaging the clutch sleeve and urging its opposite contact faces into frictional engagement with the members, the sleeve and the resilient means together with the contact faces being enclosed within the coupling and protected from the mud laden fluid of the well, the driving member and the driven member having an axial bore therethrough for the passage of the mud laden fluid.

13. A coupling as set forth in claim 12, and means for locking the resilient means in adjusted positions, said locking means being fluid-tight.

14. In a coupling for a well-bit drill stem, an elongated driving member having means at its upper end for attaching it to a tubular drill stem, an elongated driven member into which the driving member telescopes and which has means at its lower end for attaching it to a drill stem, an elongated cylindrical friction clutch sleeve split longitudinally and having inner and outer inclined contacting faces interposed between and engaging the adjacent faces of the said members, the sleeve being free to rotate and restrained against movement only by frictional contact with said members, and resilient means within the driven member engaging the clutch sleeve and urging its opposite contact faces into frictional engagement with the members, the sleeve and the resilient means, together with the contact faces, being enclosed within the coupling and protected from the mud laden fluid of the well, the driving member and the driven member having an axial bore therethrough for the passage of the mud laden fluid.

15. In a coupling for a well-bit drill stem, an elongated driving member, an elongated driven member, said members telescoping each other, an elongated frictional sleeve freely rotatable and engaging between said members, one of the members having a watertight socket, a coiled spring mounted in said socket and engaging one end of the sleeve for urging it into frictional contact with and between said members, means in the socket of said member and rotatably adjustable for varying the tension of said spring, and means for locking said adjusting means in selected positions.

16. In a device of the character described, a driving member, a driven member, a frictional clutch sleeve, spring means for urging the sleeve into engagement with the members, an adjustable element for varying the force of the spring, means for locking said element in selected adjusted positions, a bearing engaging the spring rotatable and axially adjustable of one of the members, said bearing being contained within an internal socket formed in said member.

In testimony whereof I affix my signature.

GUSTAVUS A. MONTGOMERY.